United States Patent [19]

Brunner et al.

[11] Patent Number: 5,322,141
[45] Date of Patent: Jun. 21, 1994

[54] WHEEL DRIVE MODULE NOTABLY FOR A MOTOR VEHICLE

[75] Inventors: Raphaël Brunner, Bienne; Jacques Müller, Reconvilier, both of Switzerland

[73] Assignee: SMH Management Services AG, Biel, Switzerland

[21] Appl. No.: 921,838

[22] Filed: Jul. 29, 1992

[30] Foreign Application Priority Data

Jul. 29, 1991 [FR] France ............................. 91 09714

[51] Int. Cl.⁵ .............................................. B60K 7/00
[52] U.S. Cl. .................................. 180/65.5; 180/65.6; 464/97
[58] Field of Search ................ 464/97; 180/65.5, 65.6, 180/214, 65.1; 310/80, 83

[56] References Cited

U.S. PATENT DOCUMENTS

| | | | |
|---|---|---|---|
| 2,346,432 | 4/1944 | Heintz | 464/97 |
| 3,368,743 | 2/1968 | Chaboseau | 464/97 X |
| 3,477,547 | 11/1969 | Kress et al. | 180/65.6 X |
| 3,937,293 | 2/1976 | Susdorf | 180/65.6 |
| 3,938,354 | 2/1976 | Lehman | 464/97 X |
| 4,330,045 | 5/1992 | Myers | 180/65.6 |
| 4,583,425 | 4/1986 | Mann et al. | 74/730 |
| 4,747,796 | 5/1988 | Iwai et al. | 464/97 X |
| 5,087,229 | 2/1992 | Hewko et al. | 180/65.5 X |
| 5,150,763 | 9/1992 | Yamashita et al. | 180/65.5 X |

FOREIGN PATENT DOCUMENTS 1227783 10/1966 Fed. Rep. of Germany .
1140921 8/1957 France ................. 464/97

OTHER PUBLICATIONS

Soviet Patent Abstract, Section PQ, Week 8734, Sep. 2, 1987.
Soviet Patent Abstract, Section PQ, Week 8420, Jun. 27, 1984.

Primary Examiner—David M. Mitchell
Assistant Examiner—Michael Mar
Attorney, Agent, or Firm—Weil, Gotshal & Manges

[57] ABSTRACT

The wheel drive module comprises a motor (9), a casing (1) partially housing the motor, a wheel support platform (22), a wheel (R) rigidly mounted on the platform, a reduction transmission (31) engaging directly between the motor and the wheel, and a single main transmission shaft (12) bearing the rotor (13) of the motor as well as an input member (35) of the transmission.

The casing (1) comprises on the side of the wheel, a fixing shank (18) externally receiving a bearing for said platform (22). The length of the shank is equal to the distance (d) between the input member (35) of the transmission (31) and the free end of the rear part of the platform (22). The reduction transmission (31) is housed in the platform (22). Finally a portion of the main transmission shaft that is torsionally deformable is housed inside the fixing shank.

8 Claims, 6 Drawing Sheets

WHEEL DRIVE MODULE NOTABLY FOR A MOTOR VEHICLE

FIELD OF THE INVENTION

The instant invention relates to a wheel drive module notably for a motor vehicle. More particularly it relates to autonomous drive assemblies which, in a vehicle having a source of, for example, electrical or hydraulic energy, receive this energy without central conversion into mechanical energy, each wheel drive module comprising its own motor supplied by an electric cable or by a hydraulic pipe connected to the energy source via the intermediary of a suitable control device.

BACKGROUND OF THE INVENTION

In this type of module the wheel is generally coupled to the motor by a rigid kinematic chain which does not permit any play in the transmission or of the rotational couple apart from the customary play resulting from the tolerances in machine finished parts. In other words, the irregularities of the road or small obstacles (stones, unexpected bumps in the road surface) or the jolts caused by braking or accelerating are immediately transmitted from one end to the other of the kinematic chain (from the wheel to the motor or vice versa). The result is premature fatigue of the parts in which there is play and consequently more or less rapid wear thereof.

To avoid these difficulties it is useful to be able to include in the kinematic chain a predetermined and temporary difference between the input motor couple and the useful output couple in such a manner that the major part of the effects of these sudden dynamic differences is absorbed.

DESCRIPTION OF THE PRIOR ART

Wheel drive modules have previously been proposed for this purpose (SU 1,036,580 and 1,283,122) which comprise a torque shaft interposed between the motor and a reduction transmission engaging with the wheel, to absorb the dynamic differences between the rotational couple supplied by the motor and the rotational couple to which the wheel is subjected.

What is a torque shaft? When torque is applied to one end of a shaft while its other end is held in one position, the shaft will undergo elastic deformation. This deformation will result in one end of the shaft being twisted by a certain angle relative to its other end. This angle is called the torsion angle. For a shaft of constant cross-section, the torsion angle observed in relation to a given amount of torque depends, within the elastic limit, for the three following factors:

It is proportional to the length of said shaft.

It is inversely proportional to the rigidity modulus of the material from which the shaft is made.

It is inversely proportionel to the second moment of area of the cross-section of said shaft.

The expression torque shaft or torsion shaft thus applies to a shaft that is designed to exhibit, when torque is applied to one of its ends, within the elastic limit, a rather large torsion angle.

In the document SU No. 1,036,580 in particular, there is described a wheel drive module comprising on the one hand a motor and on the other hand a wheel and a reduction transmission formed by a double planetary gear engaging directly with the wheel. Interposed between these two parts is a torsion shaft fixed by one of its extremities to the motor shaft, as an extension thereof. The other extremity of this torsion shaft is fixed to a sun pinion constituting the input member of the said planetary gear. A disadvantage of a construction of this type is that it is relatively bulky and heavy.

OBJECTS OF THE INVENTION

It is thus an object of the invention to provide a light and compact wheel drive module equiped with a torque shaft and which is particularly suitable for fitting to light vehicles of small dimensions.

BRIEF DESCRIPTION OF THE INVENTION

The instant invention therefore provides a wheel drive module notably for a motor vehicle comprising a motor, a casing at least partially housing said motor, a wheel support platform, a wheel rigidly mounted on said platform, and a reduction transmission housed in said platform and engaging directly between said motor and said wheel; wherein said platform comprises on a side nearest the motor, a rear part of substantially cylindrical shape centered on the line of the axis of the wheel; said module comprises a single multifunctional main shaft bearing the rotor of said motor as well as an input member of said transmission;

said casing comprises on a side nearest the wheel, a fixing shank centered on the line of the axis of the wheel, and externally receiving a bearing for said platform, the length of said fixing shank being substantially equal to the distance between said input member and the free end of said rear part of said platform; and a portion of said main shaft situated between said input member and said rotor inside said fixing shank, having a cross-section, the second moment of area of which, is at least 10 times smaller then the second moment of area of the cross-section of the other parts of said main shaft.

The portion of the main shaft that has a cross-section, the second moment of area of which, is considerably smaller than the moment of the cross-section of the other parts of the shaft, accordingly exhibits high flexibility when twisted. Said portion of the main shaft thus can absorb the small dynamic differences that occur between the couple supplied by the motor and the couple to which the wheel is subjected. The above technical features relating to the arrangement and the shapes of the different elements that make up the wheel drive module according to the invention, further make it possible to build modules that are remarkably light and compact. Indeed, the use of a shank rigidly fixed to the casing and having a length that is substantially equal to the distance between the input member of the transmission and the rear side of the wheel supporting platform itself housing the reduction transmission, makes it possible to build assemblies of extremely small size when measured in the direction of the axis of the wheel. Finally, the flexible portion of the main shaft being housed in the fixing shank, its length does not contribute to the length of the wheel drive module.

According to a preferred embodiment of the present invention, the single multifunctional main shaft is preferably an integral piece, it can thus be lighter and more compact whilst still retaining the same mechanical characteristics. In addition, a smaller number of operations is needed to assemble the wheel drive module.

Further, the input member of the reduction transmission is preferable integral with the main shaft and can be made for example of gear steel grade 42CrMo4.

Other features and advantages of the invention are described in the following description, given solely by way of example and with reference to the appended drawings, in which:

DETAILED DESCRIPTION OF THE DRAWINGS

Figure 1:
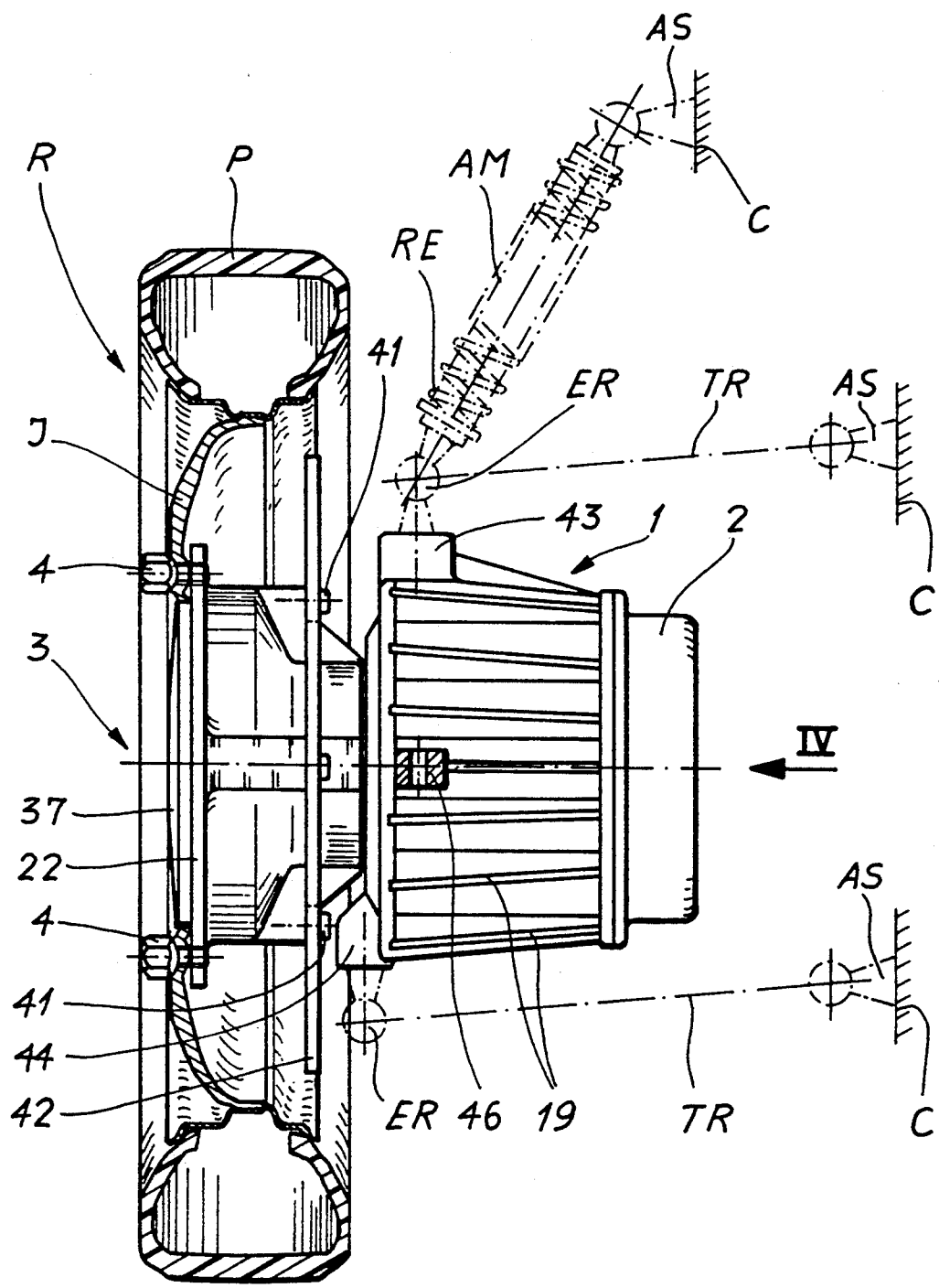
FIG. 1 is a partial vertical sectional view of a wheel drive module, notably for a motor vehicle and manufactured according to a preferred embodiment of the invention, the section being from behind, in the direction of movement of the vehicle.

Referring first to FIG. 1, this shows a general view in partial vertical and diagrammatic section of a preferred embodiment of the wheel drive module of the invention. In this case a front left module of a vehicle is shown.

As this figure shows, the wheel drive module comprises a wheel R, of conventional design, which may for example have a tyre P and a wheel rim J.

The wheel drive module of the invention is designed to be attached to a body C of the motor vehicle shown in simple diagrammatic form in the figure, by means of suspension members AS, the body C being of any desired design. It should, however, be noted that the instant invention is more particularly, but not exclusively, intended for use in small motor vehicles particularly designed to transport people.

The vehicle body is connected in conventional manner to the wheel drive module of the invention by triangular suspension members TR and by a spring assembly RE and shock absorber AM, all being of conventional design.

It should be noted that for any given specific vehicle, a wheel drive module of the invention can be provided for each of the four wheels thereof, it also being possible for two of them to have a steering function, which means that the module also has facilities making it possible to connect it to the steering system of the vehicle, the details of this construction being described in the following description.

Referring now to the detailed description of the wheel drive module, FIG. 1 shows that it comprises a casing 1 closed on the inside with respect to the vehicle by a cap 2 and connected to a wheel support assembly 3, this assembly being, moreover, fitted by means of screws 4 to the wheel rim J of the wheel R.

Figure 2:
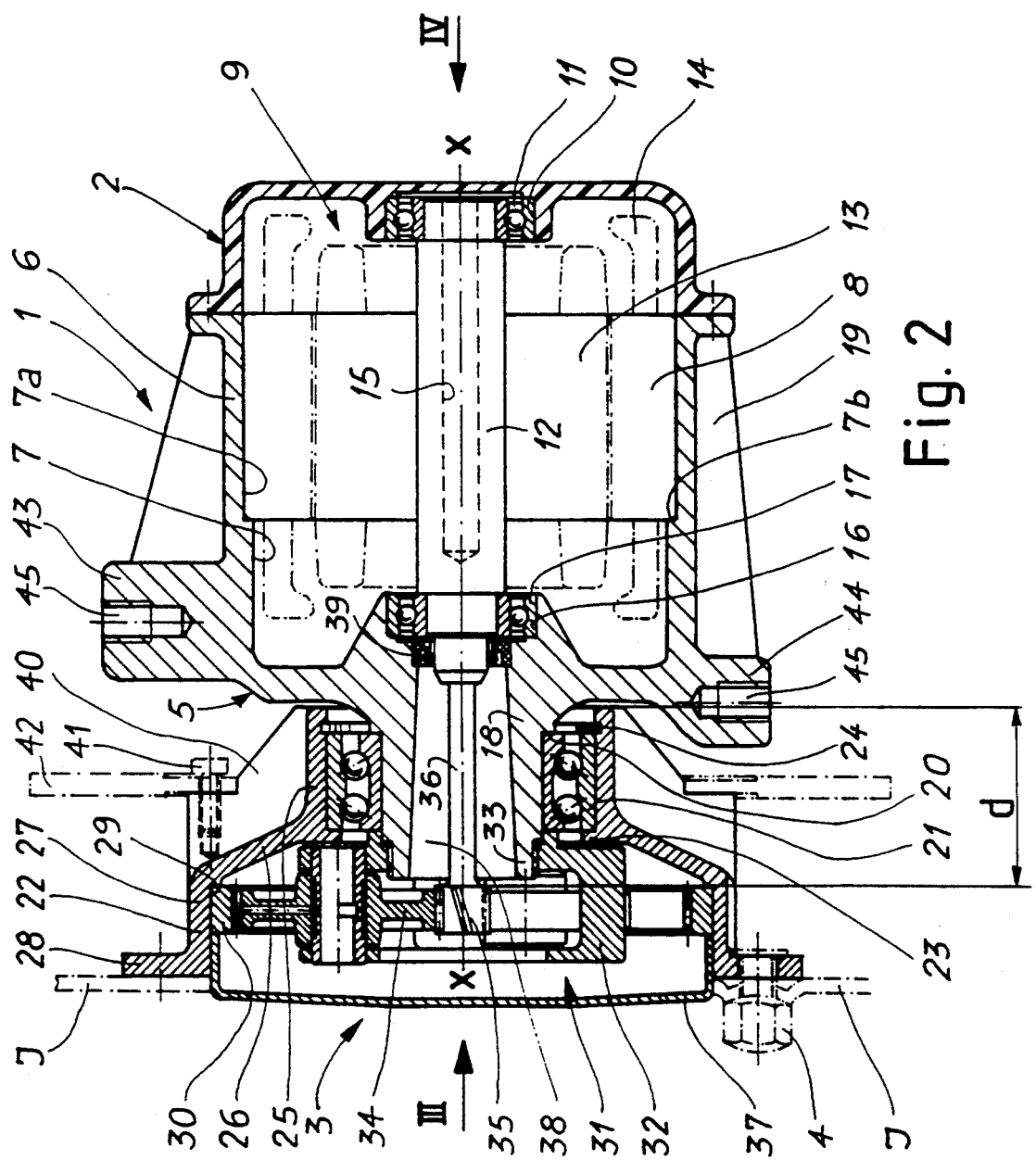
FIG. 2 is a view on a larger scale than of FIG. 1 of a partial axial section of the wheel drive module of the invention.

FIG. 2 shows that the casing 1 has a main wheel flange 5 positioned radially in relation to the central axis X—X of the wheel drive module. On the inside, this wheel flange is integral with a cylindrical part 6 aligned on the axis X—X and having an interior stepped boring 7. The rear part 7a of this boring has a larger diameter than the rest of the boring so as to define an annular shoulder 7b. Resting against this shoulder 7b is a series of plates 8 of the stator of an electric motor 9 which, in the present embodiment, is provided to ensure the drive of the wheel drive module.

It should be noted that any type of motor can be used for this purpose, a hydraulic motor being one of the possibilities.

The boring 7 of the casing 1 is closed at the back by means of the cap 2 which has a recess 10 adapted to accommodate a roller bearing 11 in which is received the inner end of a main shaft 12 of the wheel drive module. This shaft is of course centered on the axis X—X. The cap 2 can be a plastics material moulded part.

The shaft 12 carries the rotor 13 of the electric motor 9, whereas the series of plates 8 is provided with coils 14, the electric motor 9 thus formed preferably being of the asynchronous type and designed to be supplied by alternating current of adjustable frequency making it possible to adjust the operating parameters thereof.

It will be noted that in the region where it passes through the electric motor, the shaft 12 is at least partially hollow; having for example a central hole 15 designed to make it lighter.

About half way along its length the shaft 12 is mounted in a further roller bearing 16 which is located in a circular cavity 17 provided in the wheel flange 5 of the housing 1.

From the outside of the wheel flange 5 the housing 1 has a fixing shank 18 centered on the axis X—X through which the shaft 12 passes.

It will also be noted that the outside of the housing 1 is provided with cooling fins 19 regularly distributed about its periphery and extending radially therefrom.

A radial shoulder 20 is provided on the outside on the shank 18 and serves as an axial stop for the double roller bearing 21 about which is mounted a support platform 22 for the wheel which is axially positioned in relation to the roller 21 on the one hand by means of a collar 23 provided on this platform and, on the other hand, by a circlip 24 provided on the inside of the bearing 21.

The wheel support platform 22 essentially has a circular shape with a rear part 25 of smaller diameter adapted to receive the bearing 21, an intermediate tapered part 26 extending radially towards the outside and an outer cylindrical part 27 terminating in a fixing strap 28 to which the wheel rim J of the wheel is fixed by means of screws 4.

Figure 3:
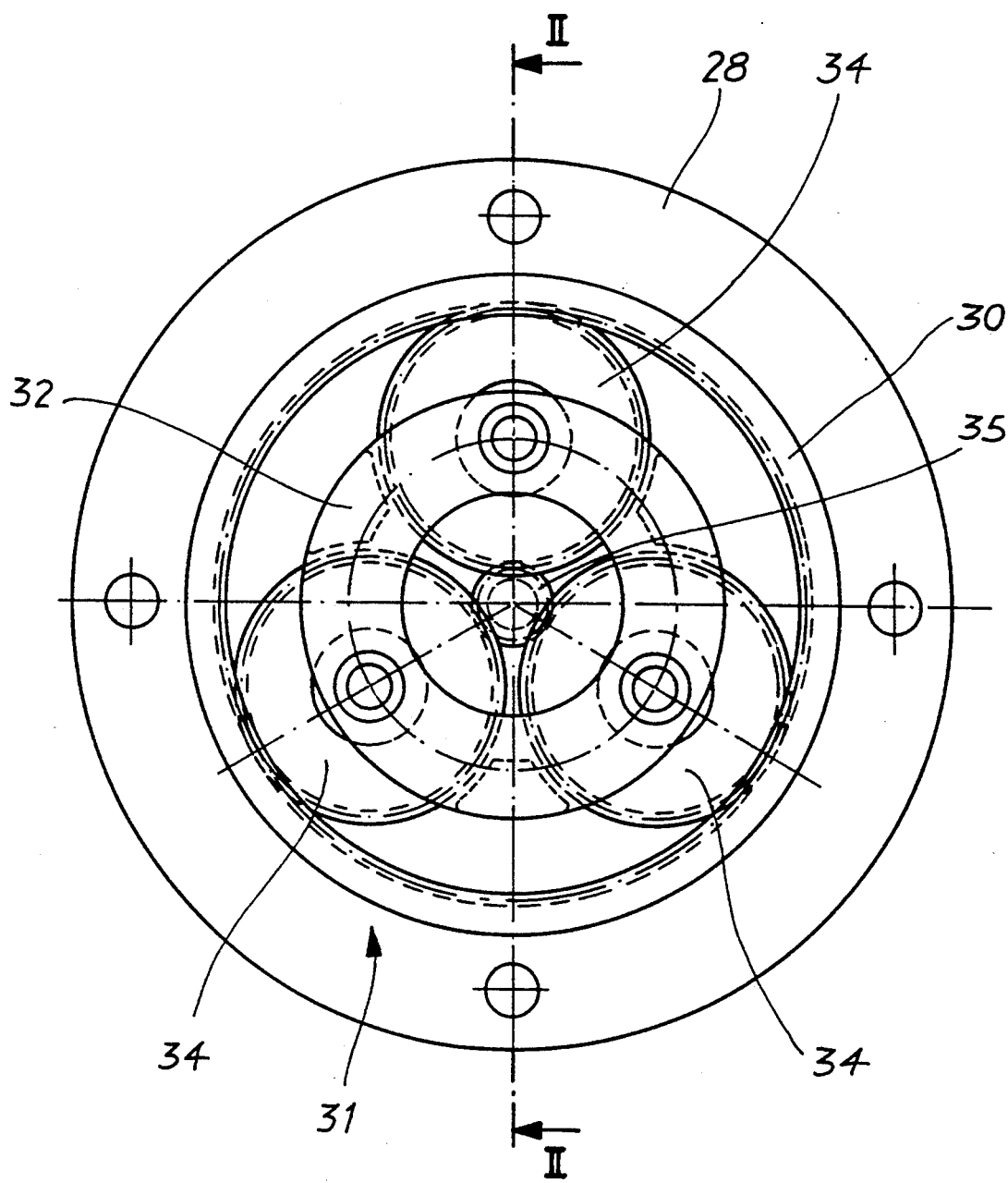
FIG. 3 is a partial front view of the wheel drive module along the arrow III of FIG. 2, the hood protecting the reduction transmission being removed.

Towards the interior, the cylindrical part 27 has an annular support surface which is connected to a radial shoulder 29 against which abuts a crown 30 of a planetary gear train 31 serving as a reduction transmission. More precisely (see also FIG. 3) this planetary gear train has a satellite holder 32 which is screwed to the threaded extremity 33 of the shank 18 of the casing 1 and a planetary pinion 35 that serves as input member for the planetary gear train 31. The length of the fixing shank 18 is substantially equal to the distance d (FIG. 2) between said planetary pinion 35 and the free end of said rear part 25 of platform 22.

The satellite holder is provided with three satellites 34 which mesh with a planetary pinion 35 cut on the outer extremity of the shaft 12.

It will be noted that, according to an essential feature of the invention, the planetary pinion 35 is connected to the rear part of the shaft 12 by means of a part 36 of this shaft serving as torsional element.

As is well known, the flexibility in torsion of a shaft of constant cross-section, is inversely proportional to the second moment of area Io of its cross-section, and:

$$Io = \int_S r^2 dS \text{ or in the case of a cylindar } Io = Io = \frac{\Pi R^4}{2}$$

where

S: is the area of the cross-section r: is the distance between the element of area dS and the axis of the shaft R: is the radius of the shaft To a predetermined degree, this torsional element 36 allows there to be a difference between the couples to which on the one hand, the shaft 12 and, on the other hand, the planetary pinion 35 are subjected. For example, if the wheel R encounters an obstacle on the road, the planetary pinion will undergo a variation in the couple due to the shock sustained by wheel, the shock being transmitted to this pinion by the wheel flange J, the wheel support platform 22 and the rotating members of the planetary gear train.

In contrast thereto, the electric motor 9 continues to supply the couple produced as a function of the actual status of the functioning parameters of the motor. In view of this, the element or torsional rod 36 is deformed about the axis X—X and absorbs the dynamic difference thereby created between the two couples. Smoothness of operation is thus improved.

The rod 36 naturally plays the same role if the electric motor is switched into another mode and caused to function as an electric brake or if its operation is subjected to sudden variation due to the operator or driver of the vehicle. The difference between the two couples can therefore be positive or negative.

For purposes of clarity, if the wheel drive module can supply a nominal couple of 10 Nm, the torsion rod is dimensioned to permit during a short time, a difference of 4 Nm in a positive or negative sense between the input couple and the output couple. In this case, the part of the shaft torsionally deformable can be 55 mm in length and 8 mm in diameter, the shaft being made of steel grade 42CrMo4.

The platform 22 is closed by a cover 37 to define a cavity 38 filled with a lubricant, this chamber being closed at the back by a seal 39.

It may also be seen that the back of the platform 22 has fixing tabs 40 (there may be four arranged at angular distances of 90°) adapted to be fixed by means of screws 41 to a disc brake 42 surrounding the assembly at this point.

Figure 5:
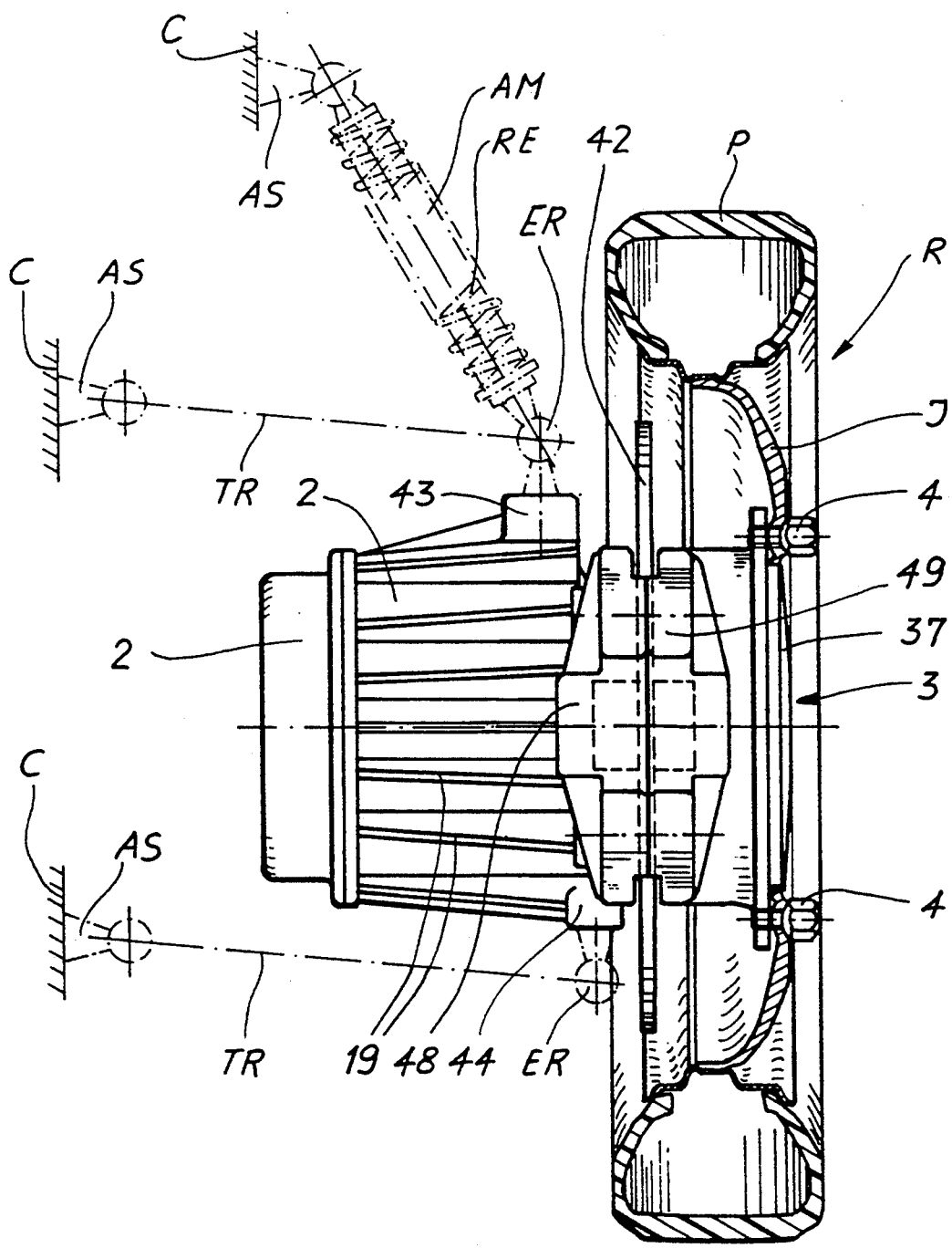
FIG. 5 is a partial vertical section of a wheel drive module of the invention from the front side in the direction of movement of the vehicle.

As may be seen from FIGS. 1, 2 and 5, the casing 1 has two radial protuberances 43 and 44 more or less diametrically opposed in a vertical plane, each of these protuberances being provided with a blind hole 45. These holes 45, the axes of which are preferably located in a vertical plane to which the main axis X—X belongs are adapted to receive rod ends ER which form part of the vehicle's suspension system (FIG. 1). It may be seen that the protuberances 43 and 44 form an integral part of the housing 1, it being understood that these are preferably supplied by the manufacturer together with the housing.

By virtue of this construction the housing 1, which thus accommodates the drive motor 9 of the wheel drive module, is used as a support structure interposed between the wheel R and the vehicle's suspension system shown schematically in FIGS. 1 and 5 by the members in broken lines TR, AM, RE and AS. Since the housing in its entirety may be made of a light, mouldable material such as aluminium or an aluminium alloy or of plastics material, possibly reinforced with glass fibre, the assembly, while conferring the requisite rigidity of a self-sustaining structure, remains compact and light in such a way that this assembly is compatible with the severe constraints imposed on the material of a motor vehicle of small dimensions and equipped with an autonomous electrical energy source supplying its drive motors.

The structure which has just been described can be used for the fixed wheels of a vehicle. Nonetheless it is possible to make therefrom steerable wheel drive modules by providing, as shown more particularly in FIGS. 1 and 4, a connection tab 46 capable of being an integral part of the housing, that is to say moulded therewith during a same moulding operation.

This connection tab 46 may be connected to a steering rod (not shown) in a manner known per se.

Figure 4:
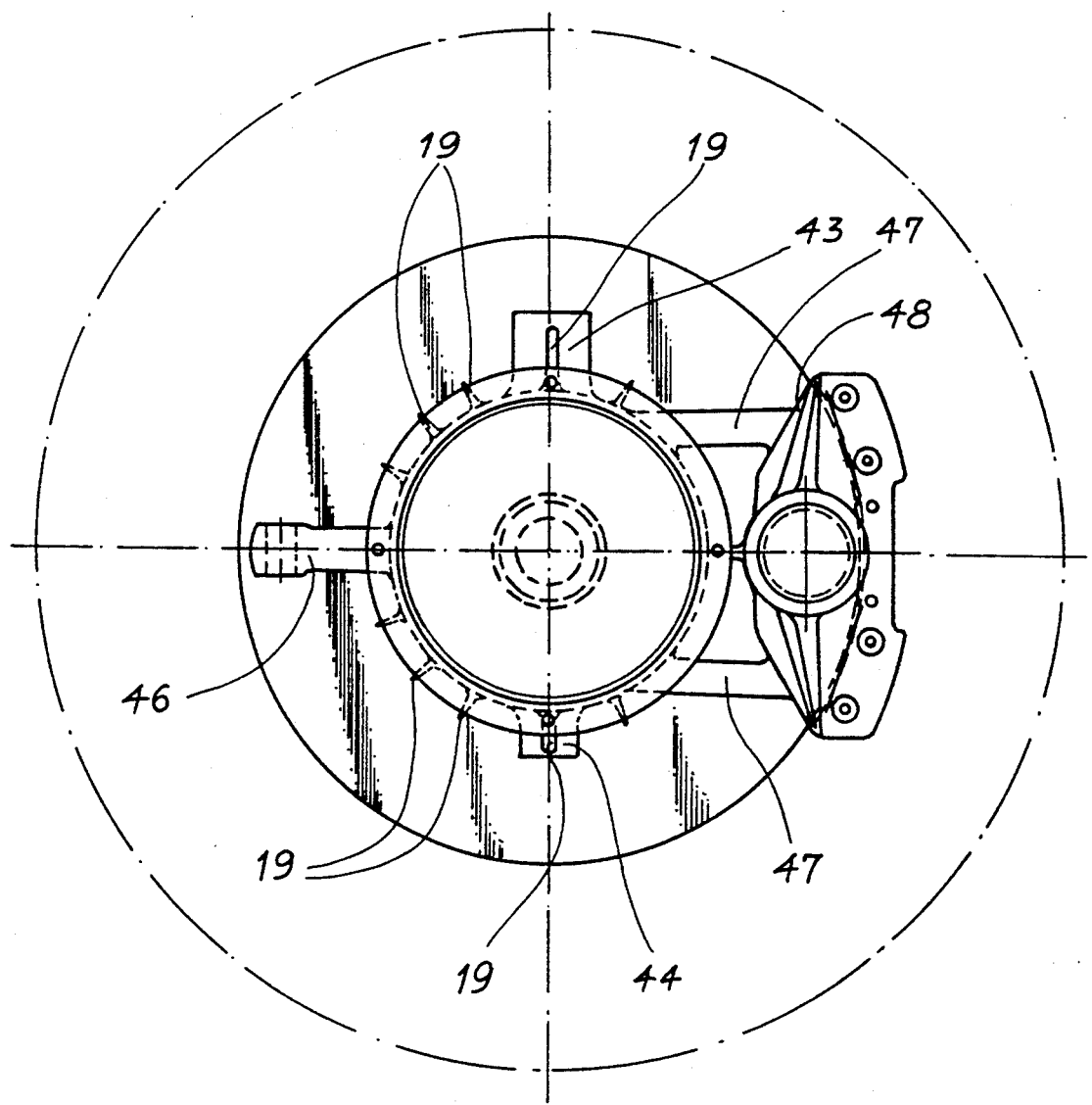
FIG. 4 is an end view taken along the arrow IV of FIG. 1.

Regardless of whether the wheel drive module is steerable or fixed, it is also possible for, as shown more specifically in FIGS. 4 and 5, that one part at least of the brake device integrated in the wheel drive module is also an integral part of the housing 1.

For this purpose, in the embodiment shown, the housing 1 has, moulded thereon two fixing tabs 47 provided for example at the back of the wheel drive module as seen in the forwards direction of movement thereof, these tabs 47 having at their free extremity half 48 of a stirrup serving to cooperate with the disc brake 42, the other half 49 of the stirrup being mounted on the half 48. The stirrup 48, 49 is of course provided with pistons and packs in the conventional manner.

It will thus be found that the assembly that has just been described is light, compact and easy to manufacture the assembly requiring very little labour.

Figure 6:
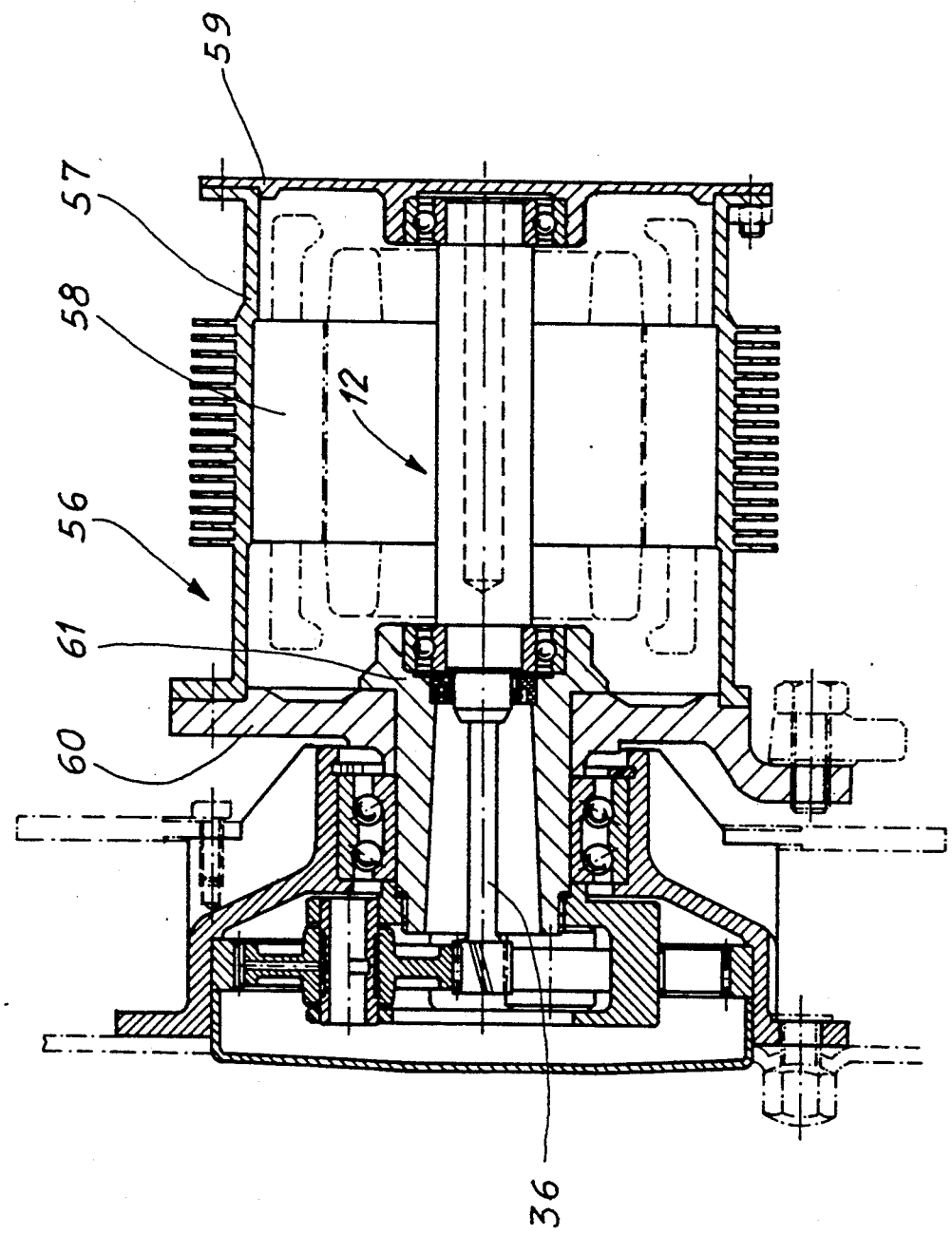
FIG. 6 shows another embodiment of the invention from a view similar to that in FIG. 2.

FIG. 6 shows another embodiment of the invention in which the main shaft 12 is identical to that of the preferred embodiment of the invention shown in FIGS. 1 to 5. The difference from the latter lies in the fact that the housing 56 of the module is made here of several pieces, notably comprising a cylindrical part 57 supporting the stator 58 of the motor and an outer wheel flange 59 closing this part on one side and supporting the main rotating shaft 12. The other end of this cylindrical part is closed by a radial disc 60 into which a sleeve 61 is inserted. This latter causes the shaft 12 and the support platform of the wheel 22 to rotate.

The disc 60 can be provided to ensure the fixing of the suspension elements of the vehicle having the module of the invention.

We claim:

1. A wheel drive module notably for a motor vehicle, comprising a motor, a casing at least partially housing said motor, a wheel support platform, a wheel rigidly mounted on said platform and having a rotational axis, and a reduction transmission housed in said platform and engaging directly between said motor and said wheel; wherein said platform comprises on a side nearest the motor, a rear portion of substantially cylindrical shape centered on the rotational axis of the wheel for internally receiving a bearing to allow for rotation of the platform and of the wheel, said rear portion having a free end extending towards said casing; said module further comprising a single multifunctional main shaft carrying the rotor of said motor as well as an input member of said transmission, said main shaft having a first portion of relative small cross sectional area and a second portion of greater cross sectional area; and said casing comprising on a side nearest the wheel, a fixing shank centered on the rotational axis of the wheel, and externally receiving said bearing, said fixing shank being integral with a portion of said casing, and the length of said fixing shank being substantially equal to the distance between said input member and the free end of said rear part of said platform;

said first portion of said main shaft being situated between said input member and said rotor, and being disposed a second moment of area of which is less than one tenth the second moment of area of said second portion of main shaft.

2. A wheel drive module according to claim 1, wherein said main shaft is an integral piece.

3. A wheel drive module according to either of claims 1 or 2, wherein said main shaft is at least partially hollow.

4. A wheel drive module according to either of claims 1 or 2, wherein said main shaft has rotational symmetry, and said first portion of said main shaft has the smallest radius of said main shaft.

5. A wheel drive module according to claim 2, wherein said input member of said transmission is integral with said main shaft.

6. A wheel drive module according to claim 3, wherein said main shaft has rotational symmetry, and said first portion of said main shaft has the smallest radius of said main shaft.

7. A wheel drive module according to claim 3 wherein said input member of said transmission is integral with said main shaft.

8. A wheel drive module according to claim 4 wherein said input member of said transmission is integral with said main shaft.

* * * * *